US010169054B2

(12) United States Patent
Dhupar et al.

(10) Patent No.: US 10,169,054 B2
(45) Date of Patent: Jan. 1, 2019

(54) UNDO AND REDO OF CONTENT SPECIFIC OPERATIONS

(71) Applicant: International Business Machines Corporation, Armonk, NY (US)

(72) Inventors: Vimal Dhupar, Ghaziabad (IN); Manish Kataria, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 14/579,057

(22) Filed: Dec. 22, 2014

(65) Prior Publication Data

US 2016/0179978 A1    Jun. 23, 2016

(51) Int. Cl.
G06F 7/00       (2006.01)
G06F 17/00      (2006.01)
G06F 9/451      (2018.01)
G06F 9/44       (2018.01)

(52) U.S. Cl.
CPC ............ G06F 9/451 (2018.02); G06F 9/4443 (2013.01)

(58) Field of Classification Search
CPC ......... G06F 17/30395; G06F 17/30867; G06F 17/30067
See application file for complete search history.

(56) References Cited

U.S. PATENT DOCUMENTS

| 4,815,029 | A | 3/1989 | Barker et al. |
| 5,481,710 | A | 1/1996 | Keane et al. |
| 6,108,668 | A * | 8/2000 | Bates ...................... G06F 17/24 |
| 6,523,134 | B2 | 2/2003 | Korenshtein |
| 6,527,812 | B1 | 3/2003 | Bradstreet |
| 6,574,717 | B1 * | 6/2003 | Ngai ................. G06F 17/30371 |
| | | | 707/E17.007 |
| 7,003,695 | B2 | 2/2006 | Li |

(Continued)

FOREIGN PATENT DOCUMENTS

| EP | 0872801 A2 | 10/1998 |
| EP | 1780637 A1 | 5/2007 |

OTHER PUBLICATIONS

Cheng, et al.; "A Selective Undo/Redo Method in 3D Collaborative Modeling Environment"; Proceedings of the 2012 IEEE 16th International Conference on Computer Supported Cooperative Work in Design; Copyright 2012 IEEE; pp. 102-108.

(Continued)

*Primary Examiner* — Hasanul Mobin
(74) *Attorney, Agent, or Firm* — Michael Purdham (57) ABSTRACT

A list of performed operations is received containing all operations performed in an order of processing. A request from a user is received including at least one of an undo request of a last performed operation or a redo request of a last performed undo request from the list of performed operations and the request includes at least one content type. A content type of each performed operation in the list of performed operations is determined. All performed operations from the list of performed operations that have a content type the same as one content type of the at least one content types is determined. The at least one of an undo request of a last performed operation or redo request of the last performed undo request from the list of performed operations that have one content type of the at least one content types is performed.

18 Claims, 3 Drawing Sheets

(56) References Cited

U.S. PATENT DOCUMENTS

| | | | |
|---|---|---|---|
| 7,093,086 B1* | 8/2006 | van Rietschote | G06F 11/1438 |
| | | | 711/161 |
| 7,100,106 B1* | 8/2006 | Ramaley | G06F 17/30067 |
| | | | 707/999.202 |
| 9,146,914 B1 | 9/2015 | Dhaundiyal | |
| 2004/0205663 A1 | 10/2004 | Mohamed | |
| 2005/0217459 A1* | 10/2005 | Murakoshi | G06F 17/30017 |
| | | | 84/600 |
| 2007/0128899 A1* | 6/2007 | Mayer | G06F 9/4406 |
| | | | 439/152 |
| 2008/0109717 A1 | 5/2008 | Krauter | |
| 2009/0035733 A1* | 2/2009 | Meitar | G09B 7/00 |
| | | | 434/118 |
| 2010/0293554 A1* | 11/2010 | Rastogi | G06F 9/44505 |
| | | | 719/313 |
| 2011/0107246 A1 | 5/2011 | Vik | |
| 2011/0113326 A1* | 5/2011 | Baer | G06F 17/2211 |
| | | | 715/255 |
| 2012/0047434 A1* | 2/2012 | Ginetti | G06F 17/24 |
| | | | 715/255 |
| 2012/0083908 A1* | 4/2012 | Carpenter | G07F 17/3211 |
| | | | 700/91 |
| 2013/0117238 A1 | 5/2013 | Gower | |
| 2013/0173703 A1* | 7/2013 | Burris | G06F 9/445 |
| | | | 709/204 |
| 2013/0227454 A1 | 8/2013 | Thorsander et al. | |

OTHER PUBLICATIONS

Disclosed Anonymously; "Contextual Non-Linear Undo/Redo Mechanism for Structured Text Documents"; Publication Date: Jan. 11, 2012; IPCOM000214130D.

WHATWG Wiki; "Undo Manager Problem Descriptions"; UndoManager Problem Descriptions—WHATWG Wiki; Printed: Sep. 25, 2014; <https://wiki.whatwg.org/wiki/UndoManager_Problem_Descriptions>.

* cited by examiner

UNDO AND REDO OF CONTENT SPECIFIC OPERATIONS

BACKGROUND OF THE INVENTION

The present invention relates generally to the field of undo and redo operations, and more particularly to undo and redo operations based upon the content type affected by the operations.

Undo and redo is a function used daily in computer systems to undo the last operation performed or redo the last operation that was undone. Currently, a user can undo anything they have done by mistake. Alternatively, if a user deletes something or undoes something, they can redo that operation and have the content return to its previous form. Undo and redo perform operations in a last in first out (LIFO) manner. LIFO refers to the way items stored in some types of data structures are processed. By definition, in a LIFO-structure linear list, elements can be added or taken off from only one end, called the "top". A LIFO structure can be illustrated with the example of a stack of trays; the last tray to be placed on top is also the first to be taken off the top. In other words, the last operation done, or placed on the top, is the first operation undone, or taken off the top.

SUMMARY

Embodiments of the present invention include a method, computer program product, and system for performing undo or redo requests. In one embodiment, a list of performed operations is received, wherein the list of performed operations contains all operations performed in an order of processing. A request from a user is received, wherein the request includes at least one of an undo request of a last performed operation or a redo request of a last performed undo request from the list of performed operations and the request includes at least one content type. A content type of each performed operation in the list of performed operations is determined. All performed operations from the list of performed operations that have a content type the same as one content type of the at least one content types is determined. Responsive to determining all performed operations from the list of performed operations that have a content type the same as one content type of the at least one content types, the at least one of an undo request of a last performed operation or redo request of the last performed undo request from the list of performed operations that have one content type of the at least one content types is performed.

DETAILED DESCRIPTION

Embodiments of the present invention allow for the performance of undo or redo requests. First, an undo/redo program receives a list of performed operations. The list of performed operations contains all of the operations performed in an order of processing. Next, a user makes an undo or redo request. The undo or redo request includes content type(s) for the request. Next, undo/redo program determines the content types of all the operations in the list of performed operations received previously. Next, undo/redo program determines all performed operations from the list of performed operations that that affect the same content type as the at least one content type of the request. Finally, undo/redo program performs an undo request of the last performed operation or a redo request of the last performed undo request from the list of performed operations that have the same content type as the at least one content type of the request.

Some embodiments of the present invention recognize that user's need more control over undo/redo operations as an increasing number of media types are used in different applications and documents. However, user's still want the option to use a LIFO structure when needed. Embodiment of the present invention are particularly useful when modifying items like emails, presentations, and other items that contain multiple type of content.

Figure 1:
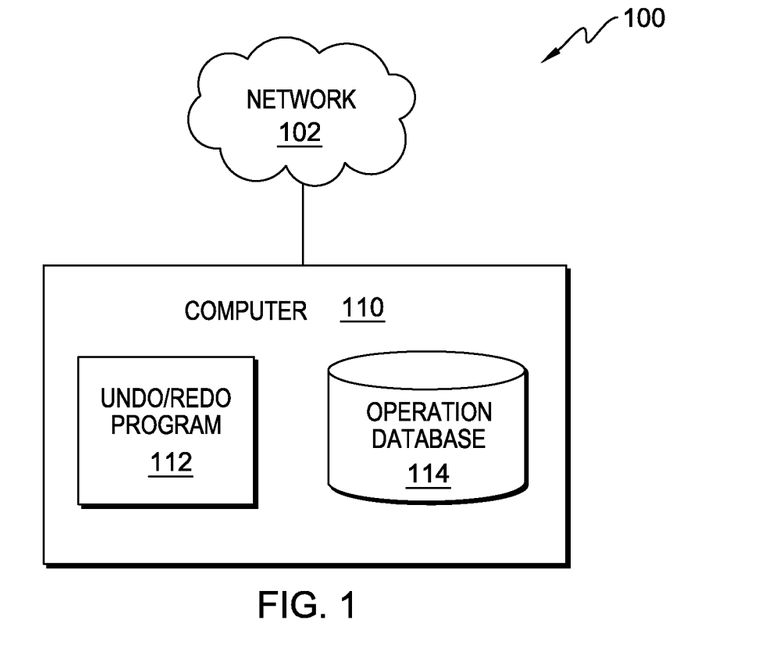
FIG. 1 is a functional block diagram of a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

An embodiment of data processing environment 100 includes computer 110, connected to network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computer 110 and any other computing device connected to network 102, in accordance with embodiments of the present invention.

In example embodiments, computer 110 may be a laptop, tablet, or netbook personal computer (PC), a desktop computer, a personal digital assistant (PDA), a smart phone, or any programmable electronic device capable of communicating with any computing device within data processing environment 100. In certain embodiments, computer 110 collectively represents a computer system utilizing clustered computers and components (e.g., database server computers, application server computers, etc.) that act as a single pool of seamless resources when accessed by elements of data processing environment 100, such as in a cloud computing environment. In general, computer 110 is representative of any electronic device or combination of electronic devices capable of executing computer readable program instructions. Computer 110 may include components as depicted and described in further detail with respect to computer 300 in FIG. 3, in accordance with embodiments of the present invention.

Computer 110 includes undo/redo program 112 and operation database 114. In an embodiment, undo/redo program 112 is a program, application, or subprogram of a larger program that performs undo and redo of operations performed on computer 110. Operation database 114 contains information about operations performed on computer 110 that can be undone or redone by undo/redo program 112.

Undo/redo program 112 receives an undo/redo request from a user. Undo/redo program determines if different types of content are selected in the request. For example, content types can be broadly defined as text, audio, images, video, etc. In an embodiment, the broadly defined content types can be divided into different categories or sub-categories. For example, text type could further be sub-classified into structured text types like XML (Extensible Markup Language), JSON (JavaScript Object Notation), ATOM, etc. In another embodiment, the content types can be split into content file extensions. For example .txt, .mp3, .avi, etc. If there are no content types selected, then undo/redo program 112 receives at least one content type to be selected by a user. If there are content types selected, undo/redo program determines if there are any changes to those content types. If there are changes to the selected content types, undo/redo program 112 performs an undo or redo of the last operation of the selected content types. If there are no changes specific to those content types, undo/redo program determines if the user would like to select other content types.

If the user would like to select another content type, then undo/redo program 112 receives at least one content type selected by the user and then proceeds to determine if there are any changes to the now selected content types. If the user does not want to select another content type, undo/redo program 112 determines if the user wants to switch to LIFO undo/redo operations, regardless of content type. If the user does want to switch to LIFO undo/redo operations, then undo/redo program 112 processes the last undo/redo operation in the LIFO operation list, similar to current undo/redo processes in computer systems. If the user does not want to switch to LIFO undo/redo operations, then undo/redo program 112 ignores the undo/redo request.

A user interface (not shown) is a program that provides an interface between a user and undo/redo program 112. A user interface refers to the information (such as graphic, text, and sound) a program present to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Operation database 114 resides on computer 110. In another embodiment, operation database 114 may reside on another device or computer within data processing environment 100 or any other device not within data processing environment 100, accessible via network 102. A database is an organized collection of data. Data found in a database is typically organized to model relevant aspects of reality in a way that supports processes requiring the information found in the database. Operation database 114 can be implemented on any type of computer readable storage medium capable of storing data that may be accessed and utilized by computer 110, such as a database server, a hard disk drive, or a flash memory. In other embodiments, operation database 114 can represent multiple storage devices within computer 110.

In an embodiment, operation database 114 may include data relating to each and every operation performed in computer 110. For example, operation database 114 may include data relating to any typing that a user performs in a document, any picture a user inserts into a document, or any other content entered into a document. In an embodiment, operation database 114 operates similar to current clip board databases that store content type (meta-information) along with the operations. The operations may be at least one of moving an object, resizing an object, reshaping an object, changing an object, adding an object, removing an object, or editing text and the objects are any type of multimedia. The existing clip board database would now include new information about the content type of each operation performed by a user. Alternatively, operation database 114 may be include multiple databases, each database having content specific operations, and then a global database with soft links to connect to each content specific database. Additionally, operation database 114 still records LIFO order of all operations, the same as traditional and existing clip board databases, regardless of media type.

Operation database 114 is updated with a program or programs (not shown) internal to an operating system (OS) on computer 110. In an embodiment, all operations performed by a user are recorded. In an embodiment, operation database 114 is updated on an OS level, meaning all operations performed on the computer, regardless of which application(s) perform the operations, are recorded in the same database, operation database 114. In an alternative embodiment, operation database 114 is updated on an application level, meaning each application would have its own database or section in operation database 114.

Figure 2:
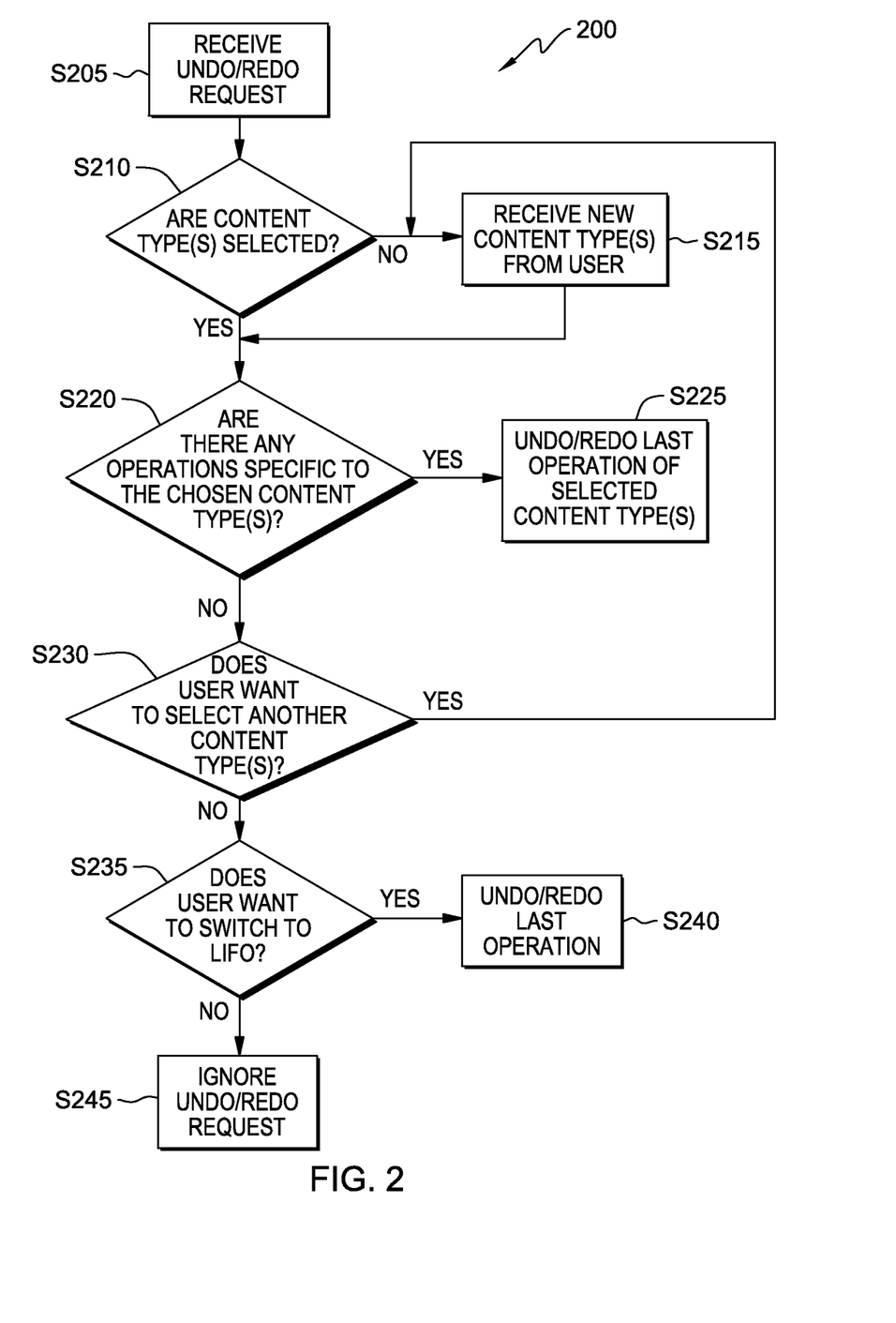
FIG. 2 is a flowchart depicting operational steps of a program for undo and redo of content specific operations, in accordance with an embodiment of the present invention.

FIG. 2 is a flowchart of workflow 200 depicting operational steps for undo and redo of operations on computer 110 based on content type, in accordance with an embodiment of the present invention. In one embodiment, the steps of the workflow are performed by undo/redo program 112. Alternatively, steps of the workflow can be performed by any other program while working with undo/redo program 112. In a preferred embodiment, a user, via a user interface discussed previously, can invoke workflow 200 upon determining that they would like to undo or redo an operation. In an alternative embodiment, workflow 200 can be invoked automatically under the control of another program, for example, upon the user clicking on a button in a document application that indicates that the user would like to undo the last operation, the undo/redo program 112 begins a step in workflow 200.

Undo/redo program 112 receives an undo/redo request (step S205). A user, using user interface discussed previously, will indicate to undo/redo program 112 that they would like undo/redo an operation, generally the last performed operation. In an embodiment, the user can use traditional methods, via the UI, to do this, such as "CTRL-Z", for undo operations, and "CTRL-Y", for redo operations, used in OS. In an alternative embodiment, a user can setup specific triggers via undo/redo program 112, such as "CTRL-SHIFT-Z", for undo operations, and "CTRL-SHIFT-Y", for redo operations, or any other input combinations, that are for specific content types, based on frequent or convenient usage. In yet another alternative embodiment, the user can click on a button in an application, discussed previously, to indicate an undo or redo request.

Undo/redo program 112 determines if content type(s) are selected (decision block S210). Undo/redo program 112 determines if the user has chosen certain content type(s) of operations to be undone or redone. For example, as discussed above, content types can be broadly defined as text, audio, images, movies, etc. In an embodiment, the user, upon initialization of the OS or of a program/application, may select, via the GUI, different content type(s). In an alternative embodiment, upon a first undo/redo request, the user may be prompted, via the GUI, to select different content type(s). In yet another alternative embodiment, upon any undo/redo request, the user may be prompted, via the GUI, to select different content types from all content types. In yet another alternative, upon any undo/redo request, the user may be prompted, via the GUI, to select from a list of active content types, content types that have been used previously, in the operation database 114. If there are content type(s) selected (decision block s210, yes branch), then undo/redo program 112 proceeds to step S220.

If there are no content type(s) selected (decision block S210, no branch), then undo/redo program 112 receives new content type(s) from the user (step S215). In an embodiment, undo/redo program 112 indicates to the user the available content types(s) and the user chooses a new and/or additional content type(s). The indication may be in the GUI discussed previously. For example, a box may be displayed with more than one content types and a radio button for each content type so the user can indicate only one content type. In an alternative example, a box may be display with more than one content type and each content type has a checkbox so that the user can indicate more than one content type. Once the user has selected new and/or additional content type(s), processing continues to step S220.

Undo/redo program 112 determines if there are any operations specific to the chosen content type(s) (decision block S220). Operation database 114 has recorded all operations performed on the computer system and the types of content each operation is affected. Undo/redo program 112 determines, from the operation database 114, if any of the operations recorded are of the same content type that have been chosen by the user. For example, if the user has chosen text and images as the content types, undo/redo program 112 determines which operations in operation database 114 are text and image operations. For example, undo/redo program 112 finds two text operations, one is typing of "Hello, my name is Alex" and one is typing of "Patent Attorney", and one image operation, which is the insertion of a picture of Alex.

If there are operations specific to the chosen content type (decision block S220, yes branch), undo/redo program 112 performs the undo/redo of the last operation in time of the selected content type(s) (step S225). In other words, after determining the operations that are specific to the chosen content type(s), discussed previously in step S220, undo/redo program 112 performs the undo or redo request of the last operation performed of those determined operations. Operation database 114 records the order in which operations occur, and using the ordering, undo/redo program 112 determines which operation, of the determined operations (the operations of the chosen content type(s)), was the last to occur. Undo/redo program 112 then performs the undo/redo request of the last determined operation. In other words, if there was an undo request in step S205, undo/redo program 112 would undo the last determined operation affecting the chosen content type. If there was a redo request in step S205, undo/redo program 112 would redo the last determined operation affecting the chosen content type.

If there are no operations specific to the chosen content type (decision block S220, no branch), undo/redo program 112 determines if the user would like to select another content type(s) (decision block S230). Undo/redo program 112 prompts the user, via the GUI, to make an indication if they would like to select another content type(s). For example the GUI may display "Would you like to select another content type(s)?" and the user may choose between a box indicating "Yes" and a box indicating "No." If an indication that the user would like to select another content type(s) is received (decision block S230, yes branch), processing proceeds to step S215, discussed previously. If an indication that the user would not like to select another content type(s) is received (decision block S230, no branch), processing proceeds to step S235.

Undo/redo program 112 determines if the user wants to switch to LIFO (decision block S235). Undo/redo program 112 prompts the user, via the GUI, to make an indication if they would like to switch to LIFO. In other words, the user can decide if they would like to return to traditional undo and redo functions used on computer 110 where the last operation performed, regardless of content type affected by the operation, is the operation that is undone or redone. For example the GUI may display "Would you like to switch to LIFO?" and the user may choose between a box indicating "Yes" and a box indicating "No." If the user indicates that they would like to switch to LIFO (decision block S235, yes branch), undo/redo program 112 performs the undo/redo request of the last operation (step S240), regardless of content type affected by the operation. In other words, if there was an undo request, undo/redo program 112 would undo the last operation, and if there was a redo request in step S205, undo/redo program 112 would redo the last operation. If the user indicates that they would not like to switch to LIFO (decision block S235, no branch), undo/redo program 112 ignores the undo/redo request (step S245). In other words, undo/redo program 112 does not perform the undo or redo request received in step S205.

Figure 3:
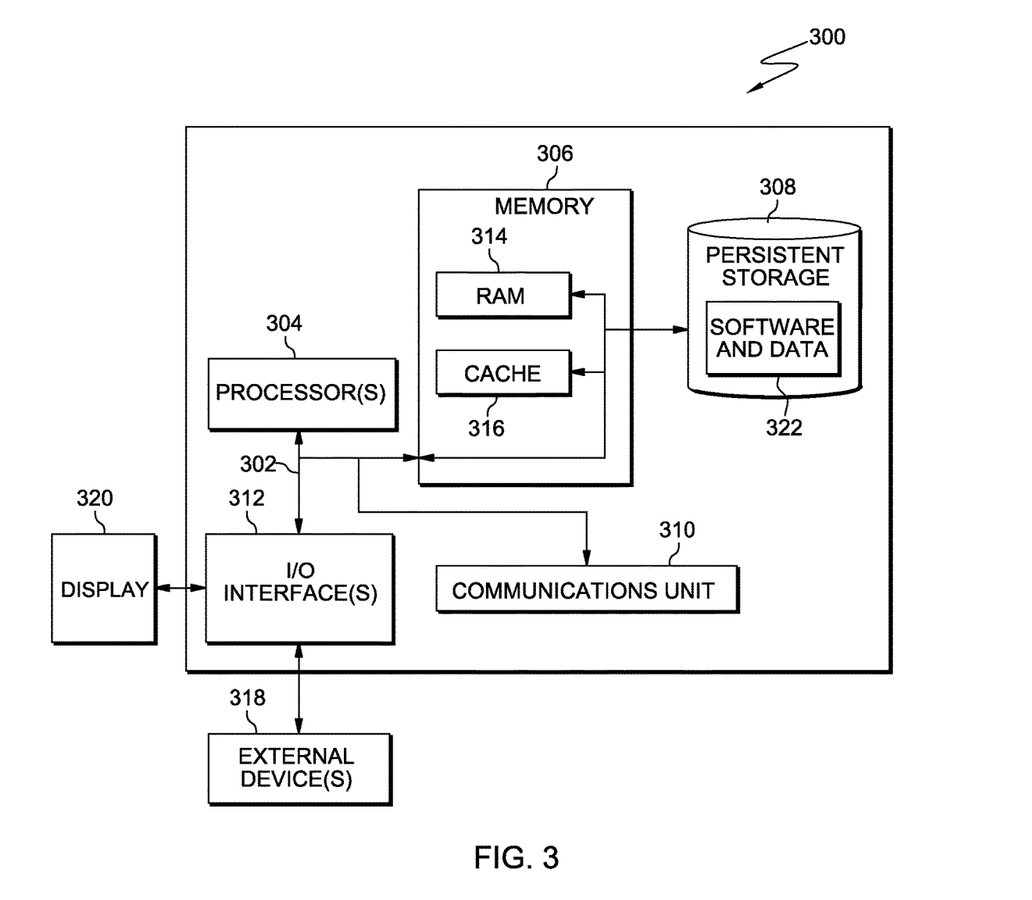
FIG. 3 depicts a block diagram of components of a computing system representative of the computer of FIG. 1, in accordance with an embodiment of the present invention.

FIG. 3 depicts a block diagram of components of computer 300, representative of computer 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processors 304 via one or more memories of memory 306. With respect to computer 110, software and data 322 includes undo/redo program 112 and operation database 114.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., undo/redo program 112, can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for performing undo or redo requests, the method comprising:
   receiving, by one or more computer processors, a list of performed operations, wherein the list of performed operations contains all operations performed in an order of processing;
   receiving, by one or more computer processors, a request from a user, wherein the request includes at least one of an undo request of a last performed operation or a redo request of a last performed undo request from the list of performed operations;
   requesting, by one or more computer processors, the user provide a selection of at least one content type, wherein the at least one content type is at least one of the following categories: text, audio, video, images;
   receiving, by one or more computer processors and from the user, the selection of at least one content type;
   determining, by one or more computer processors, a content type of each performed operation in the list of performed operations;
   determining, by one or more computer processors, a group of all performed operations from the list of performed operations that have a content type the same as one content type of the at least one content types;
   determining, by one or more computer processors, that the group of all performed operations from the list of performed operations that have a content type the same as one content type of the at least one content types consists of zero performed operations;
   requesting, by one or more computer processors, that the user provide an additional selection of at least one content type which consists of one or more performed operations;
   receiving, by one or more computer processors and from the user, the additional selection of at least one content type; and
   responsive to determining the group of all performed operations from the list of performed operations that have a content type the same as one content type of the at least one content types, performing, by one or more computer processors, the at least one of the undo request of a last performed operation or the redo request of a last performed undo request from the list of performed operations that have one content type of the at least one content types.

2. The method of claim 1, wherein the list of performed operations is a list for an operating system.

3. The method of claim 1, wherein the text content type is divided into text subcategories of XML (Extensible Markup Language) and JSON (JavaScript Object Notation).

4. The method of claim 1, wherein the content type is split into a content file extension.

5. The method of claim 1, wherein each category is divided into sub-categories.

6. A computer program product for performing undo or redo requests, the computer program product comprising:
   one or more non-transitory computer readable storage media and program instructions stored on the one or more computer readable storage media, the program instructions comprising:
   program instructions to receive a list of performed operations, wherein the list of performed operations contains all operation performed in an order of processing;
   program instructions to receive a request from a user, wherein the request includes at least one of an undo request of a last performed operation or a redo request of a last performed undo request from the list of performed operations;
   program instructions to request the user provide a selection of at least one content type, wherein the at least one content type is at least one of the following categories: text, audio, video, images;
   program instructions to receive, from the user, the selection of at least one content type;
   program instructions to determine a content type of each performed operation in the list of performed operations;
   program instructions to determine a group of all performed operations from the list of performed operations that have a content type the same as one content type of the at least one content types;
   program instructions to determine that the group of all performed operations from the list of performed operations that have a content type the same as one content type of the at least one content types consists of zero performed operations;

program instructions to request that the user provide an additional selection of at least one content type which consists of one or more performed operations;
program instructions to receive, from the user, the additional selection of at least one content type; and
program instructions, responsive to determining the group of all performed operations from the list of performed operations that have a content type the same as one content type of the at least one content types, to perform the at least one of the undo request of a last performed operation or the redo request of a last performed undo request from the list of performed operations that have one content type of the at least one content types.

7. The computer program product of claim 6, wherein the list of performed operations is a list for an operating system.

8. The computer program product of claim 6, wherein the text content type is divided into text subcategories of XML (Extensible Markup Language) and JSON (JavaScript Object Notation).

9. The computer program product of claim 6, wherein the content type is split into a content file extension.

10. The computer program product of claim 6, wherein the operation is one of the following: moving an object, resizing an object, reshaping an object, changing an object, adding an object, removing an object, or editing text.

11. The computer program product of claim 6, wherein each category is divided into sub-categories.

12. A computer system for performing undo or redo requests, the computer system comprising:
one or more computer processors;
one or more computer readable storage media; and
program instructions stored on the computer readable storage media for execution by at least one of the one or more processors, the program instructions comprising:
program instructions to receive a list of performed operations, wherein the list of performed operations contains all operation performed in an order of processing;
program instructions to receive a request from a user, wherein the request includes at least one of an undo request of a last performed operation or a redo request of a last performed undo request from the list of performed operations;
program instructions to request the user provide a selection of at least one content type, wherein the at least one content type is at least one of the following categories: text, audio, video, images;
program instructions to receive, from the user, the selection of at least one content type;
program instructions to determine a content type of each performed operation in the list of performed operations;
program instructions to determine all performed operations from the list of performed operations that have a content type the same as one content type of the at least one content types;
program instructions to determine that the group of all performed operations from the list of performed operations that have a content type the same as one content type of the at least one content types consists of zero performed operations;
program instructions to request that the user provide an additional selection of at least one content type which consists of one or more performed operations;
program instructions to receive, from the user, the additional selection of at least one content type; and
program instructions, responsive to determining all performed operations from the list of performed operations that have a content type the same as one content type of the at least one content types, to perform the at least one of the undo request of a last performed operation or the redo request of a last performed undo request from the list of performed operations that have one content type of the at least one content types.

13. The computer system of claim 12, wherein the list of performed operations is a list for an operating system.

14. The computer system of claim 12, wherein the text content type is divided into text subcategories of XML (Extensible Markup Language) and JSON (JavaScript Object Notation).

15. The computer system of claim 12, wherein the content type is split into a content file extension.

16. The computer system of claim 12, wherein the operation is one of the following: moving an object, resizing an object, reshaping an object, changing an object, adding an object, removing an object, or editing text.

17. The computer system of claim 12, wherein each category is divided into sub-categories.

18. The method of claim 1, wherein the requesting the user provide a selection of at least one content type further comprises a prompt with a list of content types; and wherein the selection was made by the user using a graphical user interface.

* * * * *